(12) United States Patent
Quenerch'Du et al.

(10) Patent No.: US 11,396,934 B2
(45) Date of Patent: Jul. 26, 2022

(54) METHOD FOR MANEUVERING DOORS OF BAYS OF AIRCRAFT, AND ACTUATOR USED THEREFOR

(71) Applicant: MESSIER-BUGATTI-DOWTY, Velizy Villacoublay (FR)

(72) Inventors: Marc Quenerch'Du, Velizy-Villacoublay (FR); Gerard Balducci, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 887 days.

(21) Appl. No.: 14/670,586

(22) Filed: Mar. 27, 2015

(65) Prior Publication Data
US 2015/0285350 A1  Oct. 8, 2015

(30) Foreign Application Priority Data

Apr. 8, 2014 (FR) ..................... 14 53122

(51) Int. Cl.
*E05B 47/00* (2006.01)
*F16H 25/24* (2006.01)
(Continued)

(52) U.S. Cl.
CPC ....... *F16H 25/2454* (2013.01); *B64C 1/1407* (2013.01); *B64C 25/26* (2013.01);
(Continued)

(58) Field of Classification Search
CPC ... F16H 25/2454; B64C 1/1407; B64C 25/26; E05F 5/06; Y10T 74/18688;
(Continued)

(56) References Cited

U.S. PATENT DOCUMENTS 3,053,104 A * 9/1962 Scavini ............... F16H 25/2025
74/89.25
7,533,590 B2 * 5/2009 Cirio ........................ B67B 3/18
53/287
(Continued)

FOREIGN PATENT DOCUMENTS

EP  2 107 273 A2  10/2009
GB  2 428 457 A   1/2007

OTHER PUBLICATIONS

French Preliminary Search Report of FR 14 53122 dated Jan. 30, 2015.

*Primary Examiner* — Christine M Mills
*Assistant Examiner* — Faria F Ahmad
(74) *Attorney, Agent, or Firm* — Sughrue Mion, PLLC

(57) ABSTRACT

The invention relates to a method for locking a mobile element (101) of an aircraft, such as a hold door or a landing gear, the mobile element being moved between a deployed position and a closed or retracted position by means of an actuator (200) having a sliding stem (3) coupled to the mobile element, the stem being mounted so as to be able to slide in a body (1) of the actuator between an extended position corresponding to the deployed position of the mobile element and a withdrawn position corresponding to the closed or retracted position of the mobile element. The method of the invention comprises the step of positively blocking the sliding stem of the actuator in the withdrawn position.

1 Claim, 1 Drawing Sheet

(51) Int. Cl.
*B64C 1/14* (2006.01)
*B64C 25/26* (2006.01)
*E05F 5/06* (2006.01)

(52) U.S. Cl.
CPC .......... *E05F 5/06* (2013.01); *E05B 2047/002* (2013.01); *Y10T 74/18688* (2015.01); *Y10T 74/20636* (2015.01); *Y10T 292/0806* (2015.04); *Y10T 292/0844* (2015.04); *Y10T 292/096* (2015.04)

(58) Field of Classification Search
CPC ........... Y10T 74/20636; Y10T 292/096; Y10T 292/0806; Y10T 292/0844; Y10T 292/57; Y10S 292/46; E05C 3/30; E05B 2015/023; E05B 15/0205; E05B 63/18; E05B 65/0014; E05Y 2900/132
USPC ................... 292/137; 74/89.37, 89.39, 89.23
See application file for complete search history.

(56) References Cited

U.S. PATENT DOCUMENTS

| | | | | |
|---|---|---|---|---|
| 7,802,488 B2 * | 9/2010 | Bucheton | ................ | B64C 25/30 |
| | | | | 74/89.23 |
| 8,272,285 B2 * | 9/2012 | Kearns | .................... | B64C 25/24 |
| | | | | 74/89.37 |
| 8,602,352 B2 * | 12/2013 | Keller | ..................... | B64C 25/20 |
| | | | | 244/102 A |
| 8,733,192 B2 * | 5/2014 | Wu | .................... | F16H 25/2454 |
| | | | | 74/89.39 |
| 8,794,085 B2 * | 8/2014 | Balducci | ............ | F16H 25/2021 |
| | | | | 74/89.35 |
| 8,794,087 B2 * | 8/2014 | Wu | ..................... | F16H 25/2015 |
| | | | | 74/89.37 |
| 8,794,088 B2 * | 8/2014 | Quenerch'Du | ......... | B64C 13/28 |
| | | | | 74/89.39 |
| 9,102,402 B2 * | 8/2015 | Dubois | ................... | B64C 25/28 |
| 9,651,066 B2 * | 5/2017 | Moretti | ................... | F15B 15/22 |
| 10,240,663 B2 * | 3/2019 | Nickel | .................... | F16H 1/203 |
| 10,518,366 B2 * | 12/2019 | Schoenbock | ............. | B23P 6/00 |
| 10,788,108 B2 * | 9/2020 | Adams | .................. | E05F 15/616 |
| 10,851,566 B2 * | 12/2020 | Deppe | ..................... | F16H 25/24 |
| 2007/0220998 A1 * | 9/2007 | Kopecek | ................. | B64C 13/28 |
| | | | | 74/89.39 |
| 2008/0210029 A1 * | 9/2008 | Wang | ..................... | F16H 25/20 |
| | | | | 74/89.38 |
| 2010/0000274 A1 * | 1/2010 | Viso Cabrera | .......... | E05B 17/22 |
| | | | | 70/278.7 |
| 2012/0137802 A1 * | 6/2012 | Balducci | ............. | F16H 25/2021 |
| | | | | 74/89.23 |
| 2012/0222510 A1 * | 9/2012 | Winther | ................... | H02K 7/06 |
| | | | | 74/89.23 |
| 2012/0304787 A1 * | 12/2012 | Quenerch'Du | ..... | F16H 25/2025 |
| | | | | 74/89.34 |
| 2014/0290403 A1 * | 10/2014 | Wu | ..................... | F16H 25/2056 |
| | | | | 74/89.35 |
| 2015/0075361 A1 * | 3/2015 | Moretti | ................... | F16F 9/182 |
| | | | | 91/430 |
| 2015/0377329 A1 * | 12/2015 | Wu | ........................ | F16H 25/20 |
| | | | | 74/89.38 |
| 2016/0167700 A1 * | 6/2016 | Fujita | ................... | B62D 5/0418 |
| | | | | 180/444 |
| 2016/0273617 A1 * | 9/2016 | Nickel | ................... | B60N 2/919 |
| 2018/0029508 A1 * | 2/2018 | Carl | ..................... | B60N 2/0232 |

\* cited by examiner

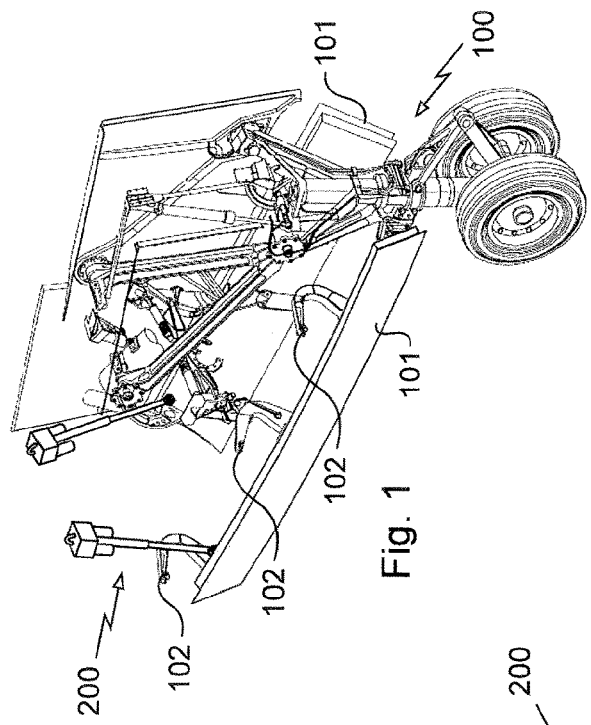
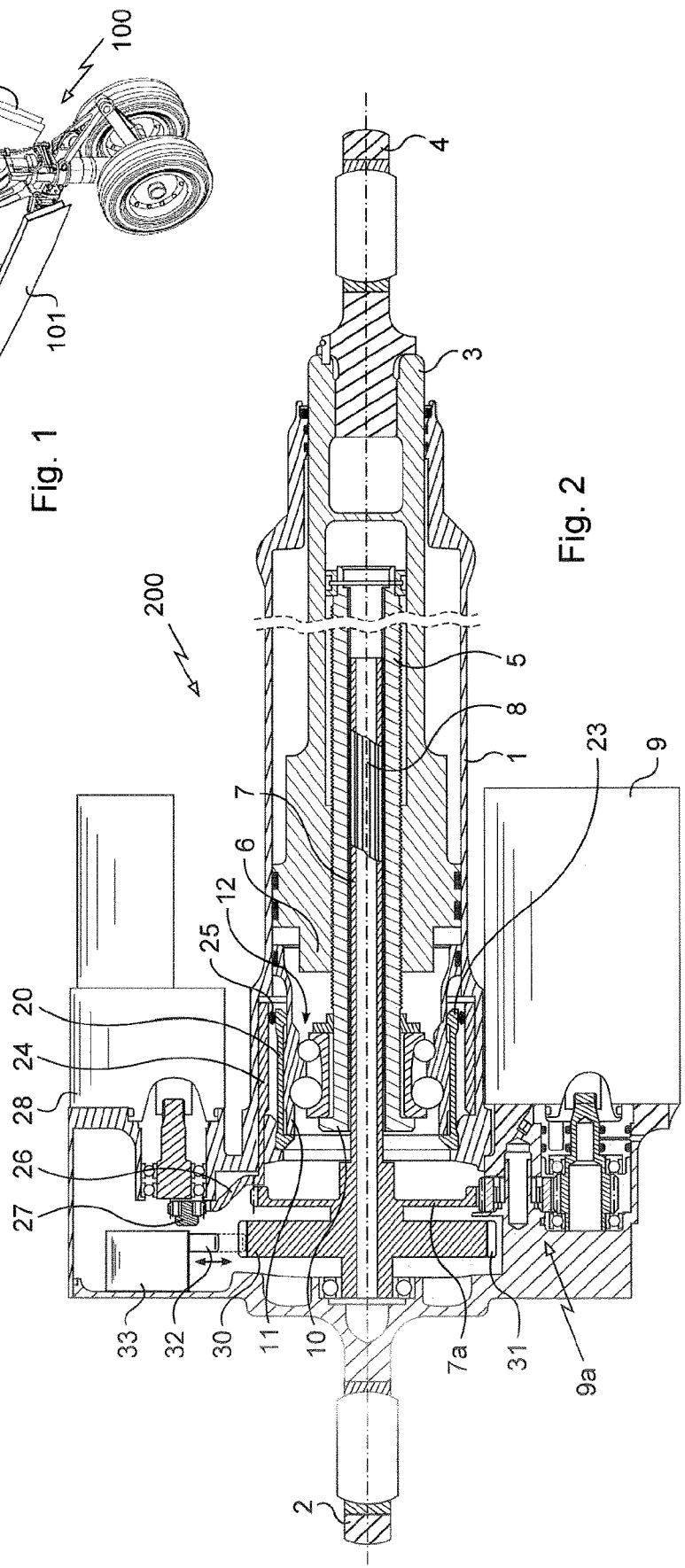

METHOD FOR MANEUVERING DOORS OF BAYS OF AIRCRAFT, AND ACTUATOR USED THEREFOR

The invention relates to the manner in which doors of bays of aircraft, in particular doors closing the bays of the landing gear, are manoeuvred and held closed, but also to the manner in which the landing gear is manoeuvred and held in the retracted position in its bay.

TECHNOLOGICAL BACKGROUND OF THE INVENTION

In an aircraft whose landing gear is able to move between a deployed position and a retracted position in which it is accommodated in respective bays, there are two types of door closing said bays: doors coupled to the landing gear, which move together with said landing gear and which close again when the landing gear reaches the retracted position, and independent doors which are not coupled to the landing gear and whose movement is independent of that of the landing gear.

Coupled doors therefore have no need of an actuator as they are manoeuvred directly by the landing gear, whereas independent doors require a dedicated actuator.

In flight, the landing gear is held in the retracted position by means of a locking hook designed to latch onto an olive which is integral with the landing gear. The door or doors coupled to this landing gear are thus also held in the closed position.

By contrast, independent doors must be held in the closed position by dedicated locking hooks designed to latch onto olives which are integral with the independent doors.

It is often difficult to couple all the doors to the landing gear. Indeed, certain doors must be able to close while the landing gear is in the deployed position, so as to minimize aerodynamic perturbations caused by air entering the bay.

In this case, it is expedient to assign them a specific actuator and a specific locking hook, which increases the number of interfaces between the door and the structure of the aircraft, without counting the multitude of electrical or hydraulic connections for controlling the actuator and the locking hook.

With reference to the landing gear, it is also necessary to manoeuvre it and hold it in the retracted position, which also requires a hook for locking in the retracted position.

OBJECT OF THE INVENTION

The invention has the object of proposing a method for locking a door or a landing gear in the closed or retracted position.

PRESENTATION OF THE INVENTION

With a view to achieving this object, there is proposed a method for locking a mobile element of an aircraft, such as a door or a landing gear, the mobile element being moved between a deployed position and a closed or retracted position by means of an actuator having a sliding stem coupled to the mobile element, the stem being mounted so as to be able to slide in a body of the actuator between an extended position corresponding to the deployed position of the mobile element and a withdrawn position corresponding to the closed or retracted position of the mobile element. According to the invention, the method for locking the mobile element in the closed or retracted position comprises the step of positively blocking the sliding stem of the actuator in the withdrawn position.

Thus, the mobile element is locked by blocking the sliding stem of the actuator in the withdrawn position, which avoids the use of an external locking hook.

According to one particular embodiment of the invention, the sliding stem is blocked by means of a blocking member inside the actuator and designed to selectively block an element of a kinematic chain between a member for driving the sliding stem and the sliding stem.

It is to be noted that electromechanical actuators which are usually proposed for manoeuvring the doors or the landing gear generally comprise an emergency control by means of which it is possible to axially free the sliding stem such that it can slide freely, for example in the event of a failure of the motor of the actuator or seizing of the kinematic chain connecting the motor to the stem. By integrating, according to the invention, the locking of the mobile element in the closed position directly in the actuator, there is no need to provide a specific emergency control which would compensate for the failure of the internal locking, since the already-existing possibility of freeing the stem then takes its place.

Therefore, it is thus possible to propose an actuator/lock for a door, having an emergency function able to compensate for the failure of the manoeuvre or of the locking.

Preferably, the telescopic actuator for implementing the method comprises:
- a body comprising means for coupling it to a first external element;
- stem mounted so as to be able to slide telescopically into the body along a sliding axis and comprising means for coupling it to a second external element;
- a lead screw mounted so as to be able to rotate on the body about the sliding axis and extending within the stem to engage with a nut integral with the stem, such that a rotation of the lead screw causes the stem to slide;
- means for turning the lead screw;
- axial retention means for the lead screw which axially retain a bearing of the lead screw, said axial retention means being controllable so as to axially release the lead screw and thus allow the sliding stem to slide freely in the body;
- a positive blocking member for selectively blocking the lead screw in rotation and thus locking the actuator in position.

According to one particular embodiment, the drive means of the telescopic actuator comprise:
- a shaft of non-circular cross section, preferably a splined shaft (7) mounted so as to be able to rotate on the body about the sliding axis and extending within the screw so as to turn the latter by means of a splined connection;
- a motor member (9) for driving the splined shaft in rotation;

and in which the axial retention means (20) can be controlled so as to selectively release a bearing (11) of the lead screw.

BRIEF DESCRIPTION OF THE FIGURES

The invention will be better understood in the light of the following description with reference to the figures of the appended drawings, in which:

FIG. 1 is a perspective view of a landing gear bay of an aircraft, showing one of the doors of the bay equipped with an actuator according to the invention;

FIG. 2 is a longitudinal section through an actuator according to one particular embodiment of the invention.

DETAILED DESCRIPTION OF THE FIGURES

FIG. 1 shows an aircraft landing gear 100 in the deployed position. In flight, the landing gear is normally retracted in its bay which is closed by doors 101. The doors comprise gooseneck hinges 102 for articulating the doors on the structure of the aircraft. Each of the doors 101 is associated with an actuator 200 which will be described in detail below and which makes it possible to manoeuvre the door between an open position, shown here, and a closed position. Each actuator is coupled on one hand to the structure of the aircraft, and on the other hand to the associated door. It will be noted that the door comprises no latching olive, and that no hook is provided for latching the door when it is returned to the closed position by the actuator 200, in accordance with the invention.

With reference now to FIG. 2, and in accordance with one particular embodiment of the invention, the actuator 200 comprises:
- a body 1 bearing, at one of its ends, a clevis 2 provided with a ball swivel for coupling to an external element, for example the structure of the aircraft, the other of the ends of the body being open;
- a stem 3 mounted so as to be able to slide telescopically in the body along the sliding axis X, and bearing at its end a clevis 4 bearing a ball swivel for coupling to a second external element, in this case one of the doors 101;
- a lead screw 5 extending inside the stem 3 and which engages therewith by a helical connection by means of a nut 6 integral with the stem 3 which forms a bearing of the stem and which is engaged on an external thread of the lead screw 5, such that a rotation of the lead screw 5 causes the stem 3 to slide;
- a shaft of non-circular cross section, for example a splined shaft 7 which extends inside the lead screw 5 and which engages therewith by a prismatic connection by means of splines 8 (shown here in part but extending over the entire length of the splined shaft 7 engaging with matching splines of the lead screw 5;
- a motor 9 designed to drive a toothed wheel 7a integral with the splined shaft 7 so as to drive the latter in rotation via the intermediary of a reduction stage 9a, said rotation of the splined shaft 7 causing the rotation of the lead screw 5.

The lead screw 5 has an end 10 bearing a bearing 11 which forms the external cage of a ball bearing 12 and which is retained axially in the body 1 by retention means 20, here of the claw type. It is to be recalled that this type of retention means comprises a hoop in which are cut claws having hook-shaped ends 23 and being able to flex radially to allow the object to be retained, in this case the bearing 11 of the lead screw 5, to pass through.

In the situation shown, the bearing 11 is imprisoned by the claws 20, the latter being prevented from flexing by means of a rotary sleeve 24 which bears on its internal face a succession of balls 25 arranged circumferentially facing the ends of the claws and separated from one another by spaces. When the sleeve 24 is placed in a first, blocking angular position (as shown here) in which the balls 25 are directly facing the ends 23 of the claws 20, the claws 20 are prevented from flexing, and the bearing 11 is held prisoner by the claws 20. When the sleeve 24 is placed in a second, releasing angular position in which the spaces between the balls 25 are brought back to face the ends 23 of the claws 20, the latter can flex radially, and the bearing can, under the effect of a tensile force on the stem 3, escape from the claws 20 to thus allow the lead screw, driven by the stem 3, to slide. In order to make the sleeve 24 pass from the blocking position to the releasing position, the sleeve is in this case made integral with a lever 26 which is manoeuvred by an eccentric 27 which is itself actuated by a motor 28. The rotation of the motor 28 causes the rotation of the eccentric 27, and thus the pivoting of the lever 26 which drives the sleeve 24 in rotation.

In the event of an emergency, for example in the event of a failure of the motor 9 or in the event of seizing of the kinematic chain connecting the motor to the sliding stem, it is then possible, by turning the sleeve 24, to release the bearing 11 and thus allow the lead screw 5 to move with the stem 3 under an external action (for example the landing gear pushing on the door coupled to the stem). Such an arrangement makes it possible to ensure that the stem 3 is able to slide freely even if the motor 9 is faulty or is no longer fed.

According to the invention, the actuator 200 is equipped with means for positively blocking the sliding stem. Here, these means comprise a wheel 30 integral with the splined shaft 7 comprising peripheral notches 31 in which a finger 32, actuated by an electromagnet 33, is accommodated in order to block the wheel 30 in rotation, which has the effect of angularly blocking the splined shaft, and thus axially blocking the sliding stem 3.

Advantageously, when closing the door, the motor 9 is fed so as to cause the sliding stem 3 to be retracted, and thus the door to be closed. When the latter arrives in abutment, a sensor generates a signal triggering the actuation of the finger 32. The assembly is managed such that no notch 31 is facing the finger when the door arrives in abutment. The motor 9 therefore has to carry on turning to bring the closest notch to beneath the finger 32, which induces a prestress in the door before it is blocked in position by blocking the sliding stem 3 in the withdrawn position.

If at any point it proves impossible to retract the finger 32, following a failure of the electromagnet 33, it remains possible to order the axial retention means 20 to release the bearing 11, making it possible for the sliding stem 3 to slide freely. The door 101 can then open, for example as a result of the thrust of the wheels of the deploying landing gear 100.

The invention is not limited to that which has just been described, but rather encompasses any variant within the scope defined by the claims. In particular, although the controllable retaining member for selectively releasing the bearing from the lead screw is in this case of the claw type, other retaining members can be used, such as for example a retaining member having a retractable segment or finger. Similarly, although the member for positively blocking the sliding stem in position is in this case of the type having a finger entering into notches of a wheel, it is possible to use other types of positive blocking member, such as for example a dog. Finally, the actuator and the method of the invention also apply to manoeuvring a landing gear and holding it in the retracted position, and more generally to any mobile element of an aircraft which can move between a deployed position and a lockable retracted position.

The invention claimed is:

1. A method for locking a mobile element (101) of an aircraft, the mobile element being moved between a deployed position and a closed or retracted position by means of a telescopic actuator (200) having a sliding stem (3) coupled to the mobile element, the sliding stem being mounted so as to be able to slide in a body (1) of the actuator between an extended position corresponding to the deployed position of the mobile element and a withdrawn position corresponding to the closed or retracted position of the mobile element, the actuator comprising drive means for moving the sliding stem between the deployed position and the closed or retracted position and a positive locking member (32) having a finger, distinct from said drive means, which can be operated so as to enter selectively into only one of all notches at time of a wheel (30) kinematically connected to the sliding stem, characterized in that it comprises the steps of:

moving the sliding stem to the withdrawn position until the mobile element arrives in the closed or retracted position wherein said mobile element is in abutment with a body of the aircraft;

continuing to cause the sliding stem to be withdrawn until the locking member is facing one of the plurality of notches for creating a pre-tension in the mobile element;

entering the locking member into the one of the plurality of notches so as to positively block the sliding stem and lock the mobile element in the closed or retracted position with the pre-tension.

\* \* \* \* \*